United States Patent
Dudar et al.

(10) Patent No.: US 9,664,126 B2
(45) Date of Patent: May 30, 2017

(54) SYSTEM AND METHODS FOR ENGINE-OFF NATURAL VACUUM TESTS

(71) Applicant: Ford Global Technologies, LLC, Dearborn, MI (US)

(72) Inventors: Aed M. Dudar, Canton, MI (US); Imad Hassan Makki, Dearborn Heights, MI (US); Fling Finn Tseng, Ann Arbor, MI (US); Robert Roy Jentz, Westland, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 55 days.

(21) Appl. No.: 14/300,140

(22) Filed: Jun. 9, 2014

(65) Prior Publication Data
US 2015/0354480 A1    Dec. 10, 2015

(51) Int. Cl.
| | | |
|---|---|---|
| *F02D 41/32* | (2006.01) | |
| *F02D 41/00* | (2006.01) | |
| *B60W 20/50* | (2016.01) | |
| *F02M 25/08* | (2006.01) | |
| *F02D 41/04* | (2006.01) | |
| *F02N 11/08* | (2006.01) | |
| *F02D 41/14* | (2006.01) | |

(52) U.S. Cl.
CPC ......... *F02D 41/0032* (2013.01); *B60W 20/50* (2013.01); *F02M 25/0809* (2013.01); *F02D 41/042* (2013.01); *F02D 2041/1412* (2013.01); *F02D 2200/701* (2013.01); *F02N 11/0814* (2013.01); *Y10S 903/902* (2013.01)

(58) Field of Classification Search
CPC .. B60W 10/06; B60W 10/08; F02M 25/0809; F02M 25/0818; F02D 29/02
USPC ........................................................ 701/22
See application file for complete search history.

(56) References Cited

U.S. PATENT DOCUMENTS

| | | | |
|---|---|---|---|
| 5,437,257 A | 8/1995 | Giacomazzi et al. | |
| 6,321,727 B1* | 11/2001 | Reddy ................ | F02M 25/0809 123/520 |
| 7,389,178 B2 | 6/2008 | Raz et al. | |
| 8,327,691 B2 | 12/2012 | Drane et al. | |
| 2005/0137757 A1 | 6/2005 | Phelan et al. | |
| 2006/0224283 A1 | 10/2006 | Fussey et al. | |
| 2011/0139130 A1* | 6/2011 | Siddiqui ............ | F02M 25/0818 123/520 |
| 2012/0197468 A1* | 8/2012 | Frederick .............. | B60W 10/06 701/22 |

(Continued)

OTHER PUBLICATIONS

Tseng, Fling et al., "Method for Triggering a Vehicle System Monitor," U.S. Appl. No. 14/189,778, filed Feb. 25, 2014, 54 pages.

(Continued)

*Primary Examiner* — Jelani Smith
(74) *Attorney, Agent, or Firm* — Julia Voutyras; McCoy Russell LLP

(57) ABSTRACT

A method for a vehicle, comprising: during a first condition, closing a canister vent valve responsive to an engine-off event without initiating an engine-off natural vacuum test; during a second condition, following the first condition, closing the canister vent valve responsive to a vehicle-off event; and then initiating an engine-off natural vacuum test. In this way, the completion percentage of the engine-off natural vacuum test will increase.

17 Claims, 7 Drawing Sheets

(56) References Cited

U.S. PATENT DOCUMENTS

| | | |
|---|---|---|
| 2012/0285238 A1* | 11/2012 | Liu .................. B60K 15/03 |
| | | 73/290 R |
| 2013/0041539 A1 | 2/2013 | Collet |
| 2014/0026866 A1 | 1/2014 | Pifher et al. |
| 2014/0060160 A1 | 3/2014 | Pursifull |
| 2014/0074385 A1 | 3/2014 | Dudar et al. |

OTHER PUBLICATIONS

Anonymous, "A Carbon Canister Integrity Diagnostic for PHEV Using Diurnal Temperature Cycle," IPCOM No. 000240457, Published Jan. 30, 2015, 2 pages.
Anonymous, "A Natural Vacuum EVAP Leak Detection Method Utilizing an Electrically Latchable Valve," IPCOM No. 000232440, Published Nov. 8, 2013, 2 pages.

* cited by examiner

US 9,664,126 B2

SYSTEM AND METHODS FOR ENGINE-OFF NATURAL VACUUM TESTS

BACKGROUND AND SUMMARY

Vehicle emission control systems may be configured to store fuel vapors from fuel tank refueling and diurnal engine operations, and then purge the stored vapors during a subsequent engine operation. In an effort to meet stringent federal emissions regulations, emission control systems may need to be intermittently diagnosed for the presence of leaks that could release fuel vapors to the atmosphere.

Evaporative leaks may be identified using engine-off natural vacuum (EONV) during conditions when a vehicle engine is not operating. In particular, a fuel system may be isolated at an engine-off event. The pressure in such a fuel system will increase if the tank is heated further (e.g. from hot exhaust or a hot parking surface) as liquid fuel vaporizes. As a fuel tank cools down, a vacuum is generated therein as fuel vapors condense to liquid fuel. Vacuum generation is monitored and leaks identified based on expected vacuum development or expected rates of vacuum development.

Current federal regulations require that the EONV test has a completion frequency of 52%, and further require that the EONV test is executed following roughly half of all drive cycles. However, not all drive cycles are conducive to successful EONV tests. For example, a short drive cycle may reject less heat to the fuel tank than a longer drive cycle, and a subsequent EONV test will not be as robust. A vehicle that typically makes trips that comprises multiple shorter trip legs may have a low completion frequency, as the engine may be restarted prior to the completion of an EONV test. Further, hybrid vehicles that operate alternately in a combustion mode and an engine-off mode may lose heat from the fuel tank during time periods when the engine is off, decreasing the accuracy of a subsequent EONV test.

The inventors herein have recognized the above problems and have developed systems and methods to at least partially address them. In one example, a method for a vehicle, comprising: during a first condition, closing a canister vent valve responsive to an engine-off event without initiating an engine-off natural vacuum test; during a second condition, following the first condition, closing the canister vent valve responsive to a vehicle-off event; and then initiating an engine-off natural vacuum test. By closing the canister vent valve during an engine-off event, heat rejected to the fuel tank may be retained during the engine-off event. By initiating the engine-off natural vacuum test at a subsequent vehicle-off event, the likelihood of an engine restart disrupting the engine-off natural vacuum test may be decreased. In this way, the engine-off natural vacuum test will have an increased completion percentage.

In another example, a method for a vehicle, comprising: at a first vehicle-off event, determining a likelihood of a next vehicle-on event during a predetermined window; and closing a canister vent valve if the likelihood is above a threshold. The likelihood of the vehicle-on event may be determined based on driving habits of the vehicle operator. In this way, the vehicle may be trained through machine learning to anticipate when the vehicle is likely to be stopped for a short period of time followed by a vehicle-on event. Engine-off natural vacuum tests may be performed when the vehicle-off duration is likely to be greater than the duration of the test.

In yet another example, a method for a hybrid vehicle, comprising: during a first condition, closing a canister vent valve while operating the hybrid vehicle in an engine-off mode; and opening the canister vent valve responsive to the hybrid vehicle entering a combustion mode. By closing the canister vent valve during engine-off operation, heat dissipation from the fuel tank may be reduced during engine-off vehicle conditions. In this way, the entry conditions for an engine-off natural vacuum test may be met more frequently. Further, by retaining heat in the fuel tank, the robustness of the engine-off natural vacuum test may be increased for vehicles with limited engine run time.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTIONS OF THE DRAWINGS

FIG. 1 schematically shows an example hybrid vehicle including a fuel system and evaporative emissions system.

FIG. 2 schematically shows an example route map including direct and indirect routes between a starting location and a destination.

DETAILED DESCRIPTION

This detailed description relates to systems and methods for leak testing a vehicle fuel system using an engine-off natural vacuum test. In particular, the description relates to retaining heat in the fuel system during engine-off events where an engine-off natural vacuum test is not executed. The fuel system may be included in a hybrid vehicle, such as the hybrid vehicle system depicted in FIG. 1. The vehicle operator may navigate the vehicle along direct and indirect routes between an origin and a destination, as shown by the route map depicted in FIG. 2. During short stops, the fuel system may be sealed without executing an EONV test, using the method depicted in FIG. 3. The likelihood of an engine restart may be determined based on driving habits and operating conditions using the method depicted in FIG. 4. FIG. 5 shows an example timeline for vehicle operation using the methods of FIGS. 3 and 4. For hybrid vehicles, the fuel system may be sealed to retain heat during engine-off vehicle operation using the method of FIG. 6. FIG. 7 shows an example timeline for vehicle operation using the method of FIG. 6.

Figure 1:
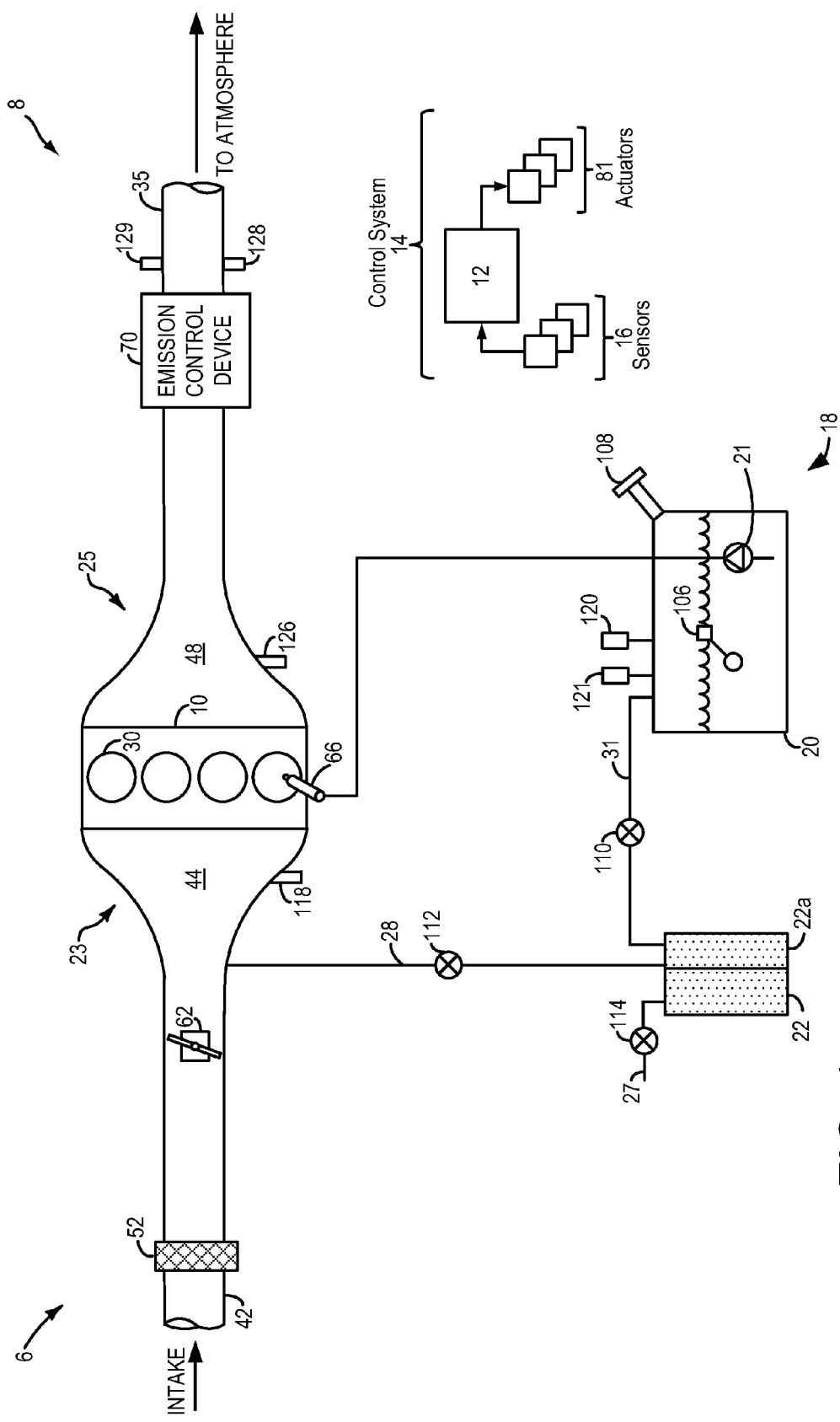

FIG. 1 shows a schematic depiction of a hybrid vehicle system 6 that can derive propulsion power from engine system 8 and/or an on-board energy storage device, such as a battery system. An energy conversion device, such as a generator (not shown), may be operated to absorb energy from vehicle motion and/or engine operation, and then convert the absorbed energy to an energy form suitable for storage by the energy storage device.

Engine system 8 may include an engine 10 having a plurality of cylinders 30. Engine 10 includes an engine intake 23 and an engine exhaust 25. Engine intake 23 includes an air intake throttle 62 fluidly coupled to the engine intake manifold 44 via an intake passage 42. Air may enter intake passage 42 via air filter 52. Engine exhaust 25 includes an exhaust manifold 48 leading to an exhaust passage 35 that routes exhaust gas to the atmosphere. Engine exhaust 25 may include one or more emission control devices 70 mounted in a close-coupled position. The one or more emission control devices may include a three-way catalyst, lean NOx trap, diesel particulate filter, oxidation catalyst, etc. It will be appreciated that other components may be included in the engine such as a variety of valves and sensors, as further elaborated in herein. In some embodiments, wherein engine system 8 is a boosted engine system, the engine system may further include a boosting device, such as a turbocharger (not shown).

Engine system 8 is coupled to a fuel system 18. Fuel system 18 includes a fuel tank 20 coupled to a fuel pump 21 and a fuel vapor canister 22. During a fuel tank refueling event, fuel may be pumped into the vehicle from an external source through refueling port 108. Fuel tank 20 may hold a plurality of fuel blends, including fuel with a range of alcohol concentrations, such as various gasoline-ethanol blends, including E10, E85, gasoline, etc., and combinations thereof. A fuel level sensor 106 located in fuel tank 20 may provide an indication of the fuel level ("Fuel Level Input") to controller 12. As depicted, fuel level sensor 106 may comprise a float connected to a variable resistor. Alternatively, other types of fuel level sensors may be used.

Fuel pump 21 is configured to pressurize fuel delivered to the injectors of engine 10, such as example injector 66. While only a single injector 66 is shown, additional injectors are provided for each cylinder. It will be appreciated that fuel system 18 may be a return-less fuel system, a return fuel system, or various other types of fuel system. Vapors generated in fuel tank 20 may be routed to fuel vapor canister 22, via conduit 31, before being purged to the engine intake 23.

Fuel vapor canister 22 is filled with an appropriate adsorbent for temporarily trapping fuel vapors (including vaporized hydrocarbons) generated during fuel tank refueling operations, as well as diurnal vapors. In one example, the adsorbent used is activated charcoal. When purging conditions are met, such as when the canister is saturated, vapors stored in fuel vapor canister 22 may be purged to engine intake 23 by opening canister purge valve 112. While a single canister 22 is shown, it will be appreciated that fuel system 18 may include any number of canisters. In one example, canister purge valve 112 may be a solenoid valve wherein opening or closing of the valve is performed via actuation of a canister purge solenoid.

Canister 22 may include a buffer 22a (or buffer region), each of the canister and the buffer comprising the adsorbent. As shown, the volume of buffer 22a may be smaller than (e.g., a fraction of) the volume of canister 22. The adsorbent in the buffer 22a may be same as, or different from, the adsorbent in the canister (e.g., both may include charcoal). Buffer 22a may be positioned within canister 22 such that during canister loading, fuel tank vapors are first adsorbed within the buffer, and then when the buffer is saturated, further fuel tank vapors are adsorbed in the canister. In comparison, during canister purging, fuel vapors are first desorbed from the canister (e.g., to a threshold amount) before being desorbed from the buffer. In other words, loading and unloading of the buffer is not linear with the loading and unloading of the canister. As such, the effect of the canister buffer is to dampen any fuel vapor spikes flowing from the fuel tank to the canister, thereby reducing the possibility of any fuel vapor spikes going to the engine.

Canister 22 includes a vent 27 for routing gases out of the canister 22 to the atmosphere when storing, or trapping, fuel vapors from fuel tank 20. Vent 27 may also allow fresh air to be drawn into fuel vapor canister 22 when purging stored fuel vapors to engine intake 23 via purge line 28 and purge valve 112. While this example shows vent 27 communicating with fresh, unheated air, various modifications may also be used. Vent 27 may include a canister vent valve 114 to adjust a flow of air and vapors between canister 22 and the atmosphere. The canister vent valve may also be used for diagnostic routines. When included, the vent valve may be opened during fuel vapor storing operations (for example, during fuel tank refueling and while the engine is not running) so that air, stripped of fuel vapor after having passed through the canister, can be pushed out to the atmosphere. Likewise, during purging operations (for example, during canister regeneration and while the engine is running), the vent valve may be opened to allow a flow of fresh air to strip the fuel vapors stored in the canister. In one example, canister vent valve 114 may be a solenoid valve wherein opening or closing of the valve is performed via actuation of a canister vent solenoid. In particular, the canister vent valve may be an open that is closed upon actuation of the canister vent solenoid.

As such, hybrid vehicle system 6 may have reduced engine operation times due to the vehicle being powered by engine system 8 during some conditions, and by the energy storage device under other conditions. While the reduced engine operation times reduce overall carbon emissions from the vehicle, they may also lead to insufficient purging of fuel vapors from the vehicle's emission control system. To address this, a fuel tank isolation valve 110 may be optionally included in conduit 31 such that fuel tank 20 is coupled to canister 22 via the valve. During regular engine operation, isolation valve 110 may be kept closed to limit the amount of diurnal or "running loss" vapors directed to canister 22 from fuel tank 20. During refueling operations, and selected purging conditions, isolation valve 110 may be temporarily opened, e.g., for a duration, to direct fuel vapors from the fuel tank 20 to canister 22. By opening the valve during purging conditions when the fuel tank pressure is higher than a threshold (e.g., above a mechanical pressure limit of the fuel tank above which the fuel tank and other fuel system components may incur mechanical damage), the refueling vapors may be released into the canister and the fuel tank pressure may be maintained below pressure limits. While the depicted example shows isolation valve 110 positioned along conduit 31, in alternate embodiments, the isolation valve may be mounted on fuel tank 20.

One or more pressure sensors 120 may be coupled to fuel system 18 for providing an estimate of a fuel system pressure. In one example, the fuel system pressure is a fuel tank pressure, wherein pressure sensor 120 is a fuel tank pressure sensor coupled to fuel tank 20 for estimating a fuel tank pressure or vacuum level. While the depicted example shows pressure sensor 120 directly coupled to fuel tank 20, in alternate embodiments, the pressure sensor may be coupled between the fuel tank and canister 22, specifically between the fuel tank and isolation valve 110. In still other embodiments, a first pressure sensor may be positioned upstream of the isolation valve (between the isolation valve and the canister) while a second pressure sensor is positioned downstream of the isolation valve (between the isolation valve and the fuel tank), to provide an estimate of a pressure difference across the valve. In some examples, a vehicle control system may infer and indicate a fuel system leak based on changes in a fuel tank pressure during a leak diagnostic routine.

One or more temperature sensors 121 may also be coupled to fuel system 18 for providing an estimate of a fuel system temperature. In one example, the fuel system temperature is a fuel tank temperature, wherein temperature sensor 121 is a fuel tank temperature sensor coupled to fuel tank 20 for estimating a fuel tank temperature. While the depicted example shows temperature sensor 121 directly coupled to fuel tank 20, in alternate embodiments, the temperature sensor may be coupled between the fuel tank and canister 22.

Fuel vapors released from canister 22, for example during a purging operation, may be directed into engine intake manifold 44 via purge line 28. The flow of vapors along purge line 28 may be regulated by canister purge valve 112, coupled between the fuel vapor canister and the engine intake. The quantity and rate of vapors released by the canister purge valve may be determined by the duty cycle of an associated canister purge valve solenoid (not shown). As such, the duty cycle of the canister purge valve solenoid may be determined by the vehicle's powertrain control module (PCM), such as controller 12, responsive to engine operating conditions, including, for example, engine speed-load conditions, an air-fuel ratio, a canister load, etc. By commanding the canister purge valve to be closed, the controller may seal the fuel vapor recovery system from the engine intake. An optional canister check valve (not shown) may be included in purge line 28 to prevent intake manifold pressure from flowing gases in the opposite direction of the purge flow. As such, the check valve may be necessary if the canister purge valve control is not accurately timed or the canister purge valve itself can be forced open by a high intake manifold pressure. An estimate of the manifold absolute pressure (MAP) or manifold vacuum (ManVac) may be obtained from MAP sensor 118 coupled to intake manifold 44, and communicated with controller 12. Alternatively, MAP may be inferred from alternate engine operating conditions, such as mass air flow (MAF), as measured by a MAF sensor (not shown) coupled to the intake manifold.

Fuel system 18 may be operated by controller 12 in a plurality of modes by selective adjustment of the various valves and solenoids. For example, the fuel system may be operated in a fuel vapor storage mode (e.g., during a fuel tank refueling operation and with the engine not running), wherein the controller 12 may open isolation valve 110 and canister vent valve 114 while closing canister purge valve (CPV) 112 to direct refueling vapors into canister 22 while preventing fuel vapors from being directed into the intake manifold.

As another example, the fuel system may be operated in a refueling mode (e.g., when fuel tank refueling is requested by a vehicle operator), wherein the controller 12 may open isolation valve 110 and canister vent valve 114, while maintaining canister purge valve 112 closed, to depressurize the fuel tank before allowing enabling fuel to be added therein. As such, isolation valve 110 may be kept open during the refueling operation to allow refueling vapors to be stored in the canister. After refueling is completed, the isolation valve may be closed.

As yet another example, the fuel system may be operated in a canister purging mode (e.g., after an emission control device light-off temperature has been attained and with the engine running), wherein the controller 12 may open canister purge valve 112 and canister vent valve while closing isolation valve 110. Herein, the vacuum generated by the intake manifold of the operating engine may be used to draw fresh air through vent 27 and through fuel vapor canister 22 to purge the stored fuel vapors into intake manifold 44. In this mode, the purged fuel vapors from the canister are combusted in the engine. The purging may be continued until the stored fuel vapor amount in the canister is below a threshold. During purging, the learned vapor amount/concentration can be used to determine the amount of fuel vapors stored in the canister, and then during a later portion of the purging operation (when the canister is sufficiently purged or empty), the learned vapor amount/concentration can be used to estimate a loading state of the fuel vapor canister. For example, one or more oxygen sensors (not shown) may be coupled to the canister 22 (e.g., downstream of the canister), or positioned in the engine intake and/or engine exhaust, to provide an estimate of a canister load (that is, an amount of fuel vapors stored in the canister). Based on the canister load, and further based on engine operating conditions, such as engine speed-load conditions, a purge flow rate may be determined.

Vehicle system 6 may further include control system 14. Control system 14 is shown receiving information from a plurality of sensors 16 (various examples of which are described herein) and sending control signals to a plurality of actuators 81 (various examples of which are described herein). As one example, sensors 16 may include exhaust gas sensor 126 located upstream of the emission control device, temperature sensor 128, MAP sensor 118, pressure sensor 120, and pressure sensor 129. Other sensors such as additional pressure, temperature, air/fuel ratio, and composition sensors may be coupled to various locations in the vehicle system 6. As another example, the actuators may include fuel injector 66, isolation valve 110, purge valve 112, vent valve 114, fuel pump 21, and throttle 62.

Control system 14 may further receive information regarding the location of the vehicle from an on-board global positioning system (GPS). Information received from the GPS may include vehicle speed, vehicle altitude, vehicle position, etc. This information may be used to infer engine operating parameters, such as local barometric pressure. Control system 14 may further be configured to receive information via the internet or other communication networks. Information received from the GPS may be cross-referenced to information available via the internet to determine local weather conditions, local vehicle regulations, etc. Control system 14 may use the internet to obtain updated software modules which may be stored in non-transitory memory.

The control system 14 may include a controller 12. Controller 12 may be configured as a conventional microcomputer including a microprocessor unit, input/output ports, read-only memory, random access memory, keep alive memory, a controller area network (CAN) bus, etc. Controller 12 may be configured as a powertrain control module (PCM). The controller may be shifted between sleep and wake-up modes for additional energy efficiency. The controller may receive input data from the various sensors, process the input data, and trigger the actuators in response to the processed input data based on instruction or code programmed therein corresponding to one or more routines. Example control routines are described herein with regard to FIGS. 3, 4, and 6.

Controller 12 may also be configured to intermittently perform leak detection routines on fuel system 18 (e.g., fuel vapor recovery system) to confirm that the fuel system is not degraded. As such, various diagnostic leak detection tests may be performed while the engine is off (engine-off leak test) or while the engine is running (engine-on leak test). Leak tests performed while the engine is running may include applying a negative pressure on the fuel system for a duration (e.g., until a target fuel tank vacuum is reached) and then sealing the fuel system while monitoring a change in fuel tank pressure (e.g., a rate of change in the vacuum level, or a final pressure value). Leak tests performed while the engine is not running may include sealing the fuel system following engine shut-off and monitoring a change in fuel tank pressure. This type of leak test is referred to herein as an engine-off natural vacuum test (EONV). In sealing the fuel system following engine shut-off, a vacuum will develop in the fuel tank as the tank cools and fuel vapors are condensed to liquid fuel. The amount of vacuum and/or the rate of vacuum development may be compared to expected values that would occur for a system with no leaks, and/or for a system with leaks of a predetermined size. Following a vehicle-off event, as heat continues to be rejected from the engine into the fuel tank, the fuel tank pressure will initially rise. During conditions of relatively high ambient temperature, a pressure build above a threshold may be considered a passing test.

Current and future evaporative emissions regulations require monitoring for 0.02" leaks. Leak tests are subject to a completion frequency requirement (In Use Monitoring Performance) of 52%, while approximately 50% of drive cycles are required to run EONV leak tests following a vehicle-off event. While users who typically make long drives (20 minutes or more non-stop) may meet or exceed the completion frequency requirement, users who make many short trips, or stop during trips may have low completion frequency, as the amount of heat rejected to the fuel tank during a short trip may not be sufficient for a successful EONV test.

Figure 2:
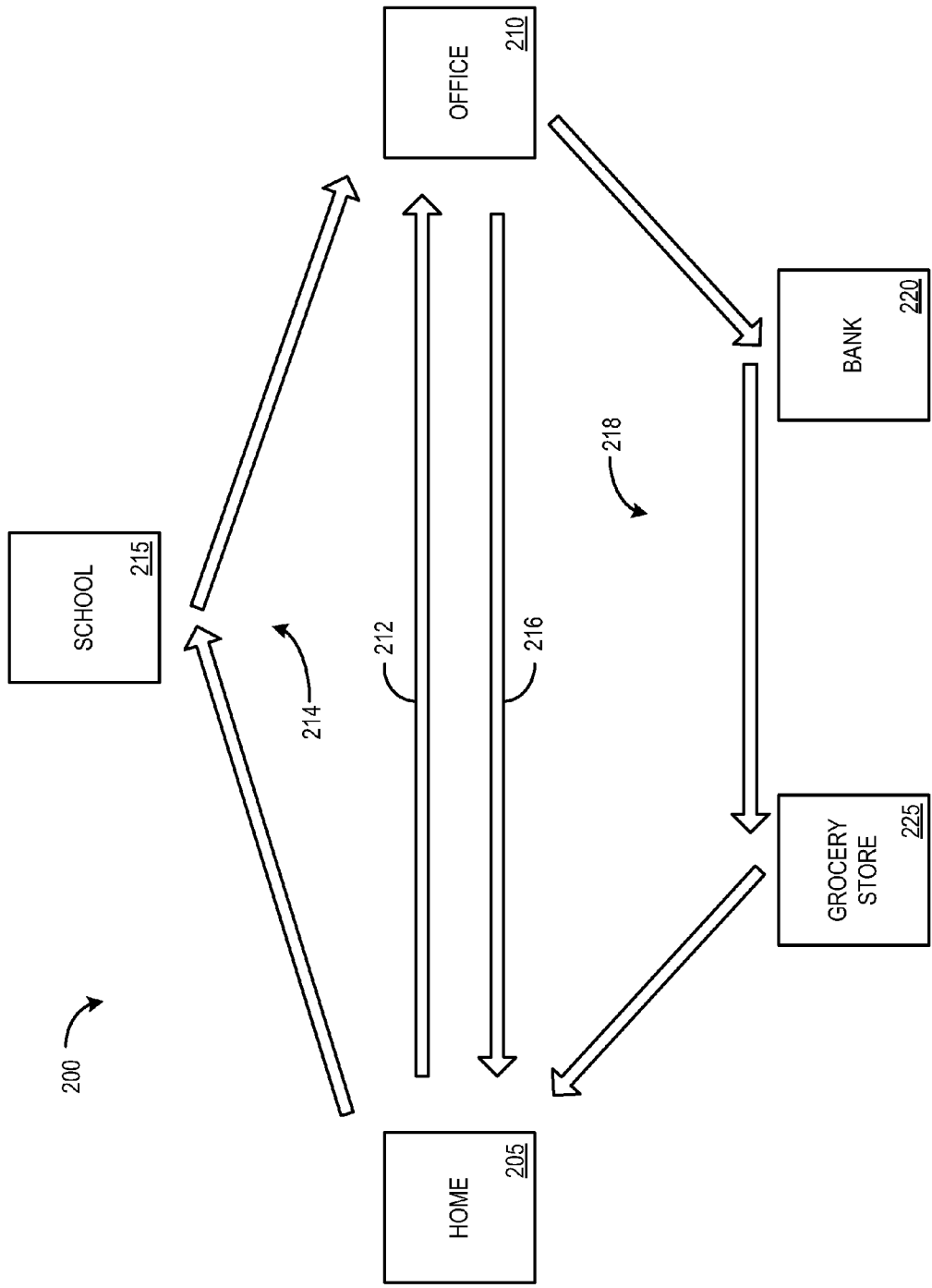

FIG. 2 schematically shows an example route map 200 for a vehicle, such as hybrid vehicle 6 described with regard to FIG. 1. Route map 200 depicts direct (e.g. no stops) and indirect (e.g. one or more stops) routes a user may navigate between the user's home 205 and the user's office 210. A user may commute to and from office 210 in predictable patterns based on the time and day of the week. For example, a user may typically take a direct route 212 between home 205 and office 210 on Monday, Wednesday, and Friday mornings. However, on Tuesday and Thursday mornings, the user may take an indirect route 214, including a stop to drop of a child at school 215. For the reverse commute, the user may typically take a direct route 216 between office 210 and home 205 on Monday, Tuesday, Wednesday, and Thursday evenings. However, on Friday evenings, the user may take an indirect route 218, including stops at a bank 220, and a grocery store 225.

Driving patterns, such as those shown in route map 200 may be used to predict driver behavior and vehicle route based on time, date, driving conditions, etc. The predicted driver behavior and vehicle route may then be used to determine the likelihood of an EONV test successfully running to completion following a vehicle-off event, for example, by predicting the likelihood of the vehicle-off duration being greater than a threshold. In other words, the likelihood of an engine restart occurring during a predetermined window may be determined. For example, on a Monday morning, if the vehicle is following direct route 212 and stops at office 210, the likelihood of the vehicle-off duration being greater than a threshold may be relatively high. However, on a Tuesday morning, if the vehicle is following indirect route 214 and stops at school 215, the likelihood of the vehicle-off duration being greater than a threshold may be relatively low. In this scenario, it may be advantageous to not run an EONV test, as the likelihood of the engine restarting during the testing duration is relatively high. A subsequent stop at office 210 may comprise a relatively high likelihood of a vehicle-off duration being greater than a threshold.

For route map 200, the duration of direct routes 212 and 216 between home 205 and office 210 may typically comprise a non-stop drive of a duration long enough for a threshold amount of heat to be rejected to the fuel tank (e.g., enough heat for an EONV test to be performed with a threshold degree of accuracy). For example, a 20 minute non-stop drive may be long enough for a threshold amount of heat to be rejected to the fuel tank. However, if there is no traffic, the heat rejected during drive may fall short of the threshold. For indirect routes 214 and 218, the total heat rejected during the drive may be greater than the threshold. However, heat will dissipate from the fuel tank while the vehicle is stopped. As such, even though the likelihood of the vehicle-off duration at the final destination (home 205 or office 210) may be greater than a threshold, the EONV test may give a false result if the heat rejected to the fuel tank is less than a threshold. Accordingly, it may be advantageous to run the EONV test only when the amount of heat rejected to the fuel tank is above a threshold, and when the likelihood of an adequate vehicle-off duration is greater than a threshold. Further, it may be advantageous to reduce heat dissipation during short vehicle-off periods, to increase the likelihood of a successful EONV test at a subsequent vehicle-off event. For example, for a user following indirect route 214, the CVV may be closed while the vehicle is stopped at school 215. In this way, the EONV test may run successfully following the vehicle-off upon the vehicle arriving at office 210.

Figure 3:
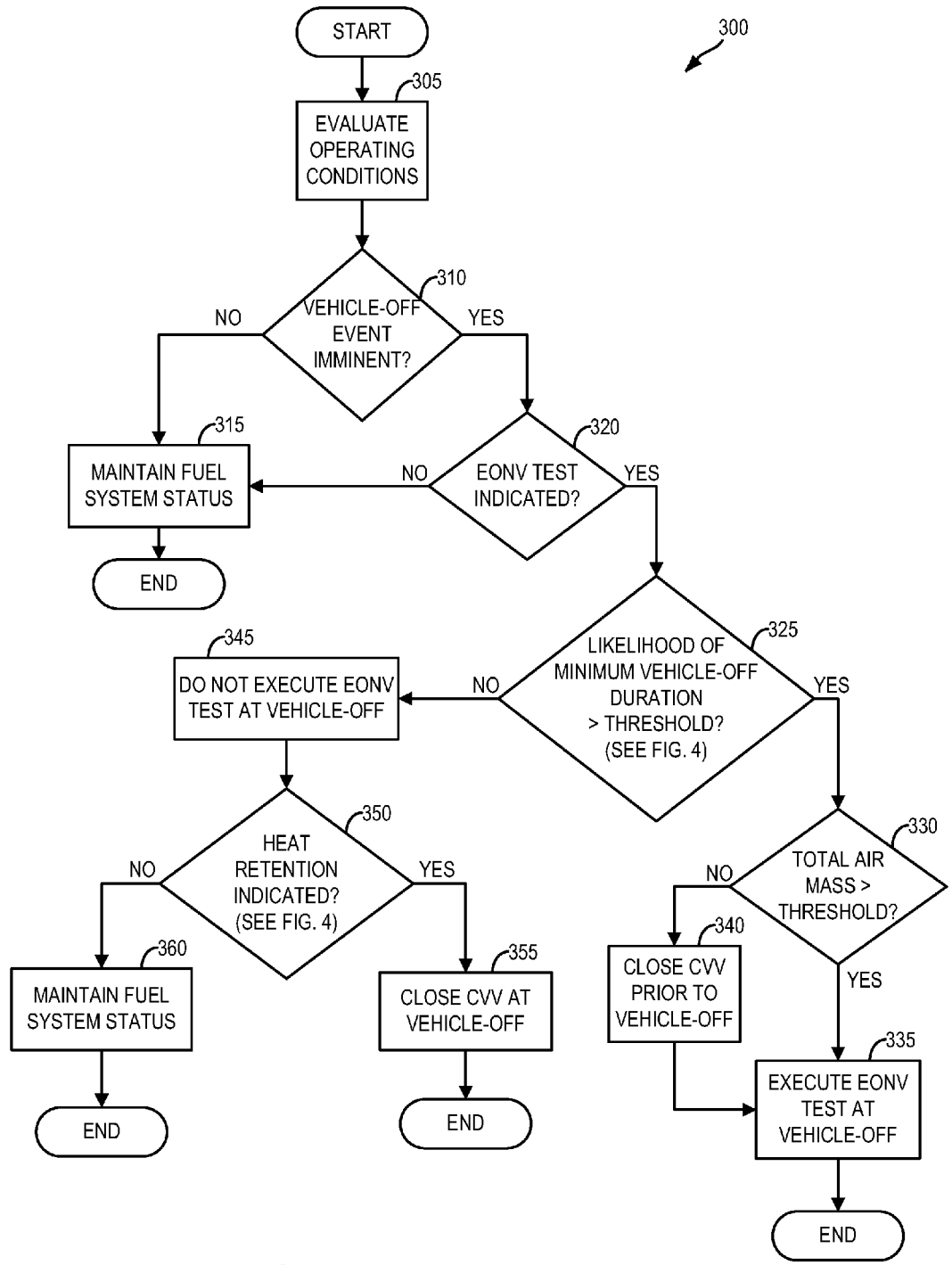
FIG. 3 shows an example flow chart for a high-level method for initiating an engine-off natural vacuum test.

FIG. 3 shows an example flow chart for a high-level method 300 for an engine-off natural vacuum test in accordance with the present disclosure. Method 300 will be described in reference to the system described in FIG. 1, though it should be understood that method 300 may be applied to other systems without departing from the scope of this disclosure. Method 300 may be carried out by a controller, such as controller 12, and may be stored as executable instructions in non-transitory memory.

Method 300 may begin at 305. At 305, method 300 may include evaluating operating conditions. Operating conditions may be measured, estimated or inferred, and may include various vehicle conditions, such as vehicle speed and vehicle location, various engine operating conditions, such as engine operating mode, engine speed, engine temperature, exhaust temperature, boost level, MAP, MAF, torque demand, horsepower demand, etc., and various ambient conditions, such as temperature, barometric pressure, humidity, date, time, etc.

Continuing at 310, method 300 may include determining whether a vehicle-off event is imminent. Determining whether a vehicle-off event is imminent may include determining that the vehicle has been placed in park, and/or may include determining that the vehicle is arriving or approaching a destination. In some examples the vehicle may be turned on and off with a key, and thus a vehicle-off event may be coincident with a key-off event. In other examples, the vehicle may be turned on and off with a push-button or other in-dash switch in the presence of a driver identification card or fob. The vehicle-off event includes the shutdown of the vehicle propulsion system and powertrain control system, though the control system may remain awake in order to perform on-board testing and/or other vehicle maintenance functions. The vehicle destination may be determined based on a route input by a user, or may be determined based on learned driver tendencies. The vehicle proximity to the destination may be determined via an on-board GPS, for example, or may be determined via wireless communication between the vehicle and a destination signifier, for example, a refueling pump, charging station, or parking arrangement.

If no vehicle-off event is imminent, method 300 may proceed to 315. At 315, method 300 may include maintaining the current status of the fuel system including maintaining the CVV open. Method 300 may then end. If a vehicle-off event is imminent, method 300 may proceed to 320. At 320, method 300 may include determining whether an EONV test is indicated following the next vehicle-off event. Determining whether an EONV test is indicated may include accessing an EONV testing history stored on controller 12, executing an algorithm to determine whether an EONV test is required to maintain vehicle emissions compliance, etc. If an EONV test is not indicated, method 300 may proceed to 315, wherein the current status of the fuel system may be maintained. Method 300 may then end.

If an EONV test is indicated, method 300 may proceed to 325. At 325, method 300 may include determining if the likelihood of a minimum vehicle-off duration necessary to run an EONV test is greater than a threshold. This determination is discussed further herein and with regard to FIG. 4. In brief, the vehicle route, vehicle location, current date and time, driver habits, cumulative and remaining trip parameters, etc., may be assessed to determine a likelihood that the duration of the vehicle-off event meets or exceeds a duration necessary to successfully execute an EONV test. In other words, the method may include determining whether a vehicle-on event is likely to occur during the duration necessary to successfully execute an EONV test. Referring to FIG. 2, if the vehicle is traveling along route 212 and approaching office 210, the likelihood of a minimum vehicle-off duration is relatively high, and may be greater than the threshold. However, if the vehicle is traveling along route 214 and approaching school 215, the likelihood of a minimum vehicle-off duration is relatively low, and may be less than the threshold.

If the likelihood of a minimum vehicle-off duration is greater than a threshold, method 300 may proceed to 330. At 330, method 300 may include determining whether the total air mass following the previous vehicle-on event is greater than a threshold. Determining the total air mass following the previous vehicle-on event may include integrating signals from a mass air flow sensor in the engine intake. The total air mass may be an indicator of work done by the engine, and further may be an indicator of thermal energy rejected by the engine to the fuel tank. The total thermal energy transferred to the fuel tank may indicate whether an EONV test will be successful, based on the fuel level, fuel tank configuration, etc. Other indicators may be used in addition to, or in conjunction with total air mass, such as engine temperature, fuel tank temperature, fuel tank pressure, ambient temperature, etc. If the total air mass is greater than a threshold, method 300 may proceed to 335. At 335, method 300 may include executing an EONV test at the next vehicle-off event. Method 300 may then end.

If the total air mass is less than a threshold, may proceed to 340. At 340, method 300 may include closing the canister vent valve prior to the vehicle-off event. In this way, heat may be retained in the fuel tank prior to the vehicle-off event as the vehicle approaches its destination. Retaining heat in this fashion may increase the likelihood of a successful EONV test. Method 300 may then continue to 335 and execute an EONV test at the next vehicle-off event. Method 300 may then end.

Returning to 325, if the likelihood of a minimum vehicle-off duration is less than a threshold, method 300 may proceed to 345. At 345, method 300 may include not executing an EONV test at the next vehicle-off event. Continuing at 350, method 300 may include determining whether heat retention is indicated. This determination is discussed further herein and with regard to FIG. 4. In brief, the vehicle route, vehicle location, current date and time, driver habits, cumulative and remaining trip parameters, total air mass, etc., may be assessed to determine a likelihood that an EONV test may be successfully executed at a subsequent vehicle-off event if heat is retained in the fuel tank during the imminent vehicle-off event. If that likelihood is above a threshold, heat retention may be indicated. If the next leg of the vehicle trip is predicted to comprise at least a threshold duration or require at least a threshold total air mass, heat retention may not be indicated. If heat retention is indicated, method 300 may proceed to 355. At 355, method 300 may include closing the CVV at the next vehicle-off event. In this way, heat is retained in the fuel tank during the imminent vehicle-off duration, thereby increasing the likelihood of a successful EONV test at a subsequent vehicle-off event. Method 300 may then end. If heat retention is not indicated, method 300 may proceed to 360. At 360, method 300 may include maintaining the fuel system status, including maintaining the CVV open. Method 300 may then end.

Figure 4:
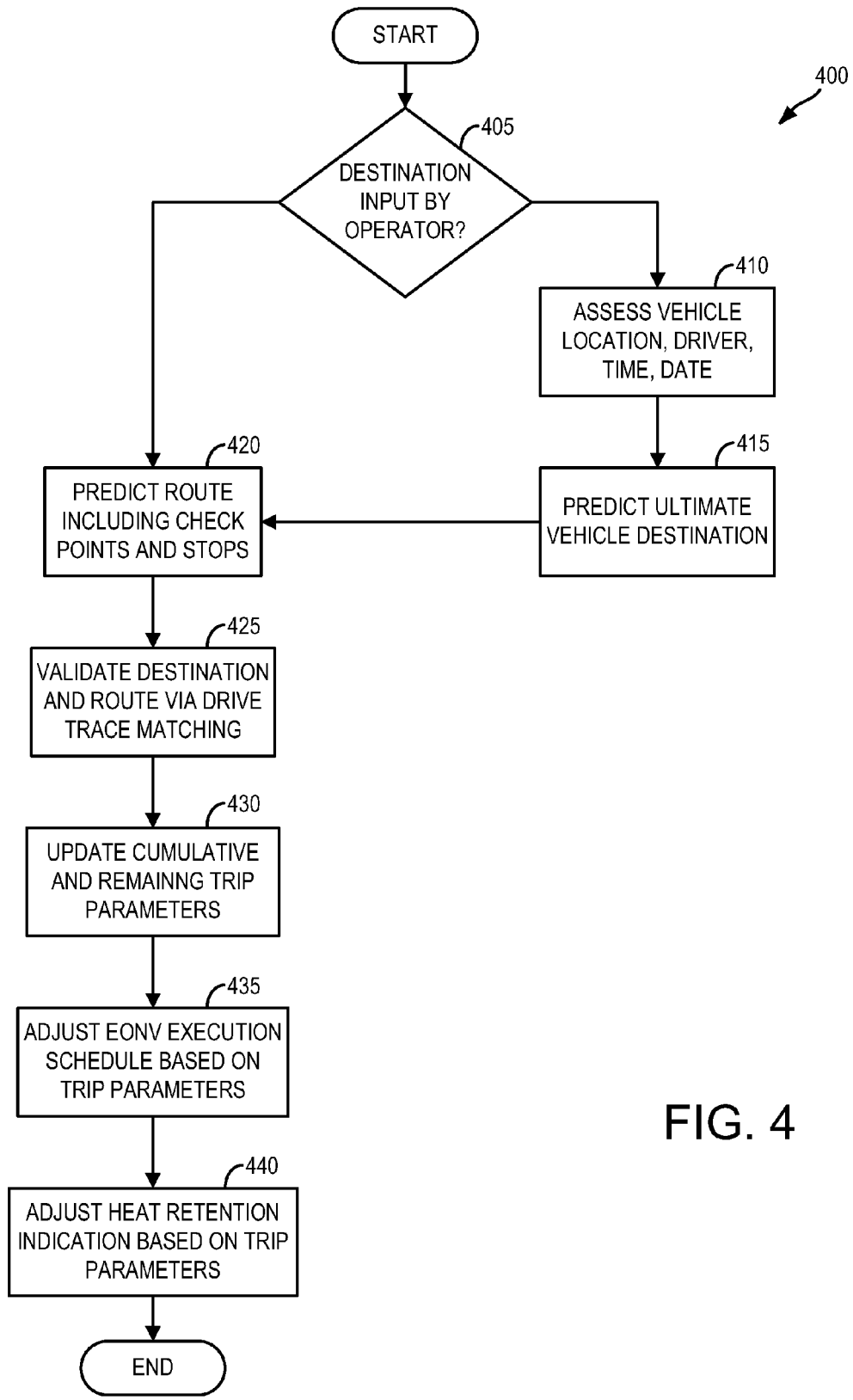
FIG. 4 shows an example flow chart for a high-level method for adjusting leak testing parameters based on a predicted vehicle route.
Figure 5:
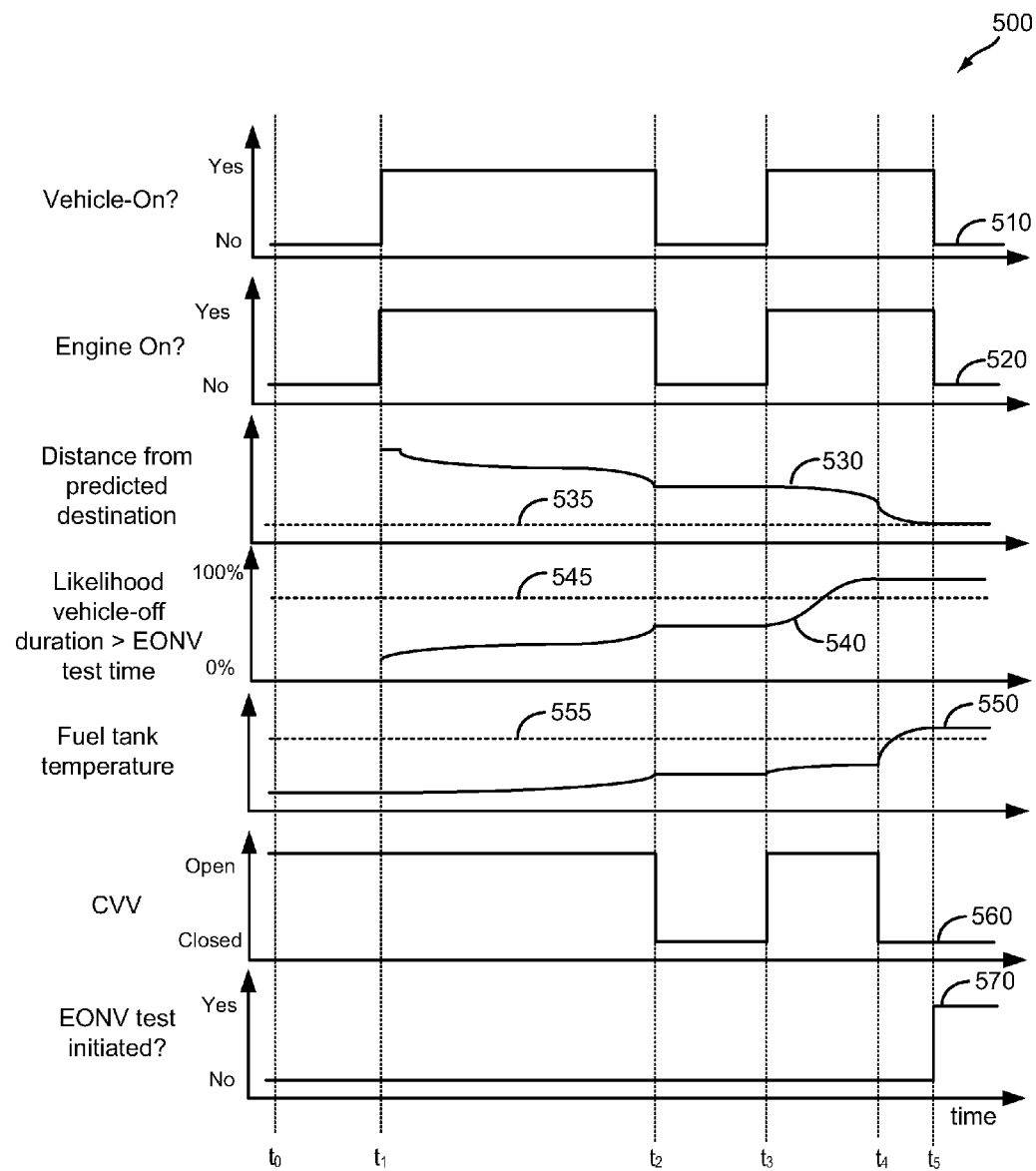
FIG. 5 shows an example timeline for initiating an EONV test using the methods of FIGS. 3 and 4.

FIG. 4 shows a flow chart for a high-level method 400 for utilizing driving habit knowledge to update EONV testing parameters. Method 400 may be run as a standalone method, or may be run as a subroutine of another method, such as method 300. Method 400 will be described in reference to the system described in FIG. 1, though it should be understood that method 400 may be applied to other systems without departing from the scope of this disclosure. Method 400 Method 400 may be carried out by a controller, such as controller 12, and may be stored as executable instructions in non-transitory memory.

Method 400 may begin at 405. At 405, method 400 may include determining whether a destination has been input by a user. For example, a user may input one or more destinations into an on board GPS system. If no destination has been input by the operator, method 400 may proceed to 410. At 410, method 400 may include assessing the vehicle location, time of day, date, day of week, trajectory, and/or driver identity. A driver's identity may be input by the driver, or inferred based on driving habits, seat position, cabin climate control preferences, voice activated commands, etc. Continuing at 415, method 400 may include predicting the ultimate vehicle destination based on the vehicle and driver information assessed at 410. The prediction may include one or more potential destinations, each potential destination given a likelihood probability or ranking relative to other potential destinations. The likelihood probability or ranking of each potential destination may be updated periodically based on changing operating conditions. Within a fleet of vehicles, a driver's information, preferences, and/or driving history may be imported from one or more other fleet vehicles to determine potential destinations and their likelihood. The predicted destination may be determined through machine learning based on the driver's information, preferences, and/or driving history.

When an ultimate destination has been determined, either as input by the user or predicted as the most likely destination, method 400 may proceed to 420. At 420, method 400 may include predicting a route for the vehicle from the current vehicle location to the determined ultimate destination. The predicted route may include checkpoints whereby the predicted route may be validated or refined, and/or potential stops the vehicle may make prior to the ultimate destination. The predicted route may be based on a learned driving pattern of the user. The user's learned driving pattern may be learned over a number of previous vehicle drive cycles based on one or more of frequent trip time patterns, habitual probability patterns, route based statistical profile, and environmental attribute profiles. Still other statistical profiles and aspects of a user's driving behavior may be used. The learned driving pattern may be stored in one-or more lookup tables in the controller's memory. The user's driving patterns may be collected to learn different routes taken by the user for a given trip (that is, when travelling from the same point of origin to the same destination). The different routes may be learned as a function of different checkpoints that the vehicle passes. The different routes may be selected by the user based on the time of day, day of week, etc. In still other examples, the operator driving patterns may include learning of traffic patterns. The traffic patterns may be learned as a function of the trip, as well as the time of day, day of week, etc. Clustering methods may be used to learn the traffic patterns and may be correlated with the route preference and other driving aspects of the operator.

Continuing at 425, method 400 may include validating the destination and route via drive trace matching. As the vehicle progresses towards a destination, the route traversed by the vehicle may be recorded and compared to the predicted route or routes. The relative probabilities of the predicted destination and routes may then be updated based on this comparison. For example, the user may select a different route based on changes in traffic patterns, or may elect to make additional stops or detours before arriving at a same ultimate destination based on a duration of a route segment. Potential routes or destinations may be considered more or less likely based on the drive trace matching process.

Continuing at 430, method 400 may include updating cumulative and remaining trip parameters. In some examples, the cumulative and remaining trip parameters may be updated in accordance with updated destination and/or route predictions. The updated trip parameters may include driving distance, driving time, accumulated airmass, drive/stop ratio, total stop duration, etc. Based on the vehicle's current location and most probable ultimate destination, remaining trip parameters may be determined based on the vehicle's operating conditions. Cumulative parameters may be determined based on the operating conditions from the beginning of the trip, and summed with the remaining parameters to predict total cumulative parameters for the entire trip. In particular, the trip parameters may include entry conditions for an EONV leak test to be performed following a vehicle-off event. The accumulated airmass may be determined by integrating signals from the MAF sensor over time, and may be representative of total work done by the engine during the trip, and hence representative of the quantity of heat rejected to the fuel tank.

Continuing at 435, method 400 may include adjusting the EONV leak test execution schedule based on the updated trip parameters. This may include evaluating the predicted route and destination probabilities as well as evaluating the cumulative and remaining trip parameters. Based on the most probable predictions, the controller may determine the likelihood of an EONV test running to a successful completion, using action logic, for example. The likelihood of an EONV test running to a successful completion may include the likelihood of a subsequent vehicle-off event lasting longer than a predetermined duration. For example, referring to the route map depicted in FIG. 2, if a vehicle is approaching school 215, the likelihood of a subsequent vehicle-off event lasting longer than the testing duration may be low. The EONV testing schedule may thus be adjusted to not run at the next vehicle-off event, and to run following a subsequent vehicle-off event, such as when the vehicle is stopped at office 210.

Continuing at 440, method 400 may include adjusting the heat retention indication based on the updated trip parameters. This may include evaluating the predicted route and destination probabilities as well as evaluating the cumulative and remaining trip parameters. Based on the most probable predictions, the controller may determine whether the amount of heat rejected to the fuel tank will exceed a threshold for an EONV test accuracy parameter at a subsequent vehicle-off event. For example, referring to the route map depicted in FIG. 2, if a vehicle is approaching school 215, and a determination has been made not to run an EONV test, the controller may determine whether a threshold amount of heat would be rejected during the route segment from school 215 to office 210. If the amount of rejected heat during that route segment is predicted to be below the threshold, the controller may close the canister vent valve while the vehicle is stopped at school 215, in order to prevent rejected heat from dissipating during the vehicle-off event. In another example, the predicted amount of rejected heat from the predicted remaining route may be used to determine if and when to close the CVV prior to a vehicle-off event. As described with regards to FIG. 3, the CVV may be closed prior to a vehicle-off event to decrease the amount of heat dissipating from the fuel tank. The CVV may be closed at a duration prior to the vehicle-off event, the duration based on the accumulative and remaining trip parameters (accumulated airmass, for example). Similarly, if the predicted amount of heat rejected to the fuel tank exceeds a threshold, the CVV may be kept open during a vehicle-off event. For example, if the amount of traffic between school 215 and office 210 indicates the duration of the trip segment will exceed a threshold, the CVV may be kept open during the vehicle-off event when the vehicle is stopped at school 215.

The EONV execution schedule and heat retention indication may be updated concomitantly and/or based on updates to each other. For example, if ambient temperature is above a threshold, the EONV test may pass on the pressure rise portion of the test. The duration necessary to execute this portion of the test is shorter than the duration necessary to perform the vacuum portion of the test. In some scenarios, the CVV could be closed prior to a vehicle-off event that is predicted to be of a duration long enough to perform the pressure rise portion of an EONV test, albeit not long enough to perform the vacuum portion of the test.

FIG. 5 shows an example timeline 500 for initiating an EONV leak test based on driving habit knowledge using the methods described herein and with regard to FIGS. 3 and 4 as applied to the system described herein and with regard to FIG. 1. Timeline 500 includes plot 510, indicating a vehicle-on status of a vehicle over time, and plot 520, indicating an engine-on status of the vehicle over time. Timeline 500 further includes plot 530 indicating the vehicle's distance from a predicted destination over time. Line 535 represents a location of the predicted destination. Timeline 500 further includes plot 540, indicating a likelihood of a subsequent vehicle-off duration being greater than the duration of an EONV test over time. Line 545 represents a likelihood threshold, above which, an EONV test will initiate if other entry conditions are met. Timeline 500 further includes plot 550, indicating a fuel tank temperature over time. Line 555 represents a threshold fuel tank temperature, above which an EONV test is likely to execute successfully. Timeline 500 further includes plot 560, indicating the status of a canister vent valve over time, and plot 570, indicating whether an EONV test has been initiated over time.

At time $t_0$, the vehicle and engine are off, as indicated by plots 510 and 520, respectively. Accordingly, the CVV is open, as shown by plot 560. At time $t_1$, the vehicle and engine are turned on. Based on the time of day, day of the week, driver history, and other operating parameters, an ultimate destination for the vehicle may be predicted, and a current distance from the predicted destination may be estimated, as shown by plot 530. Further, a most probable route for the vehicle may be predicted, including stops between the current location and the ultimate destination. Based on the most probable route, a likelihood that the next vehicle-off duration will be greater than an EONV testing duration may be determined, as shown by plot 540. At time $t_1$, the likelihood is below the threshold indicated by line 545.

From time $t_1$ to time $t_2$, the vehicle progresses towards the ultimate destination, as shown by plot 530. Accordingly, the likelihood of the next vehicle-off duration being longer than an EONV testing duration increases, but remains below the threshold indicated by line 545. While the engine is on, the fuel tank temperature increases due to heat rejected from the engine, as shown by plot 550, but remains below a threshold for EONV testing indicated by line 555. At time $t_2$, the engine and vehicle are turned off. Based on the destination and route predictions, the vehicle-off duration is likely to be less than the duration of an EONV test. Accordingly, and EONV test is not initiated, as shown by plot 570. However, in anticipation that a subsequent vehicle-off event will be of a duration greater than or equal to the duration of an EONV test, the CVV is closed to limit heat dissipation from the fuel tank, as indicated by plot 560. During the engine-off period, the fuel tank temperature remains relatively stable, as shown by plot 550.

At time $t_3$, the vehicle and engine are turned on, and the CVV is re-opened. The vehicle continues to progress towards the ultimate destination, as indicated by plot 530. Accordingly, the likelihood of the next vehicle-off duration being greater than an EONV test duration increases, as indicated by plot 540. However, the fuel tank temperature remains below the threshold where an EONV test is likely to execute successfully. At time $t_4$, the vehicle is approaching the ultimate destination, and the likelihood of the next vehicle-off duration being greater than an EONV test duration is above the threshold indicated by plot 540. In order to increase the likelihood of a successful EONV test, the CVV is closed, although the engine remains on. In this way, the fuel tank temperature increases above the threshold indicated by line 555.

At time $t_5$, the vehicle reaches its predicted destination, and the engine and vehicle are turned off. The predicted vehicle-off duration is above a threshold, and the fuel tank temperature is above a threshold. Accordingly, the CVV is maintained closed, and an EONV test is initiated.

For hybrid vehicles, vehicle-on events do not necessarily signify engine-on events. During idling, while driving in battery-only mode, or while operating in decel fuel shutoff mode (e.g., going downhill), the vehicle may be one while the engine is off. During these periods, heat may dissipate from the fuel tank. As such, if the vehicle is operating over a stop/start city drive cycle, or in extended battery mode, the drive time required for an EONV test entry condition may be increased, potentially reducing the EONV completion rate. By increasing the fuel tank heat retention during engine-off vehicle operation, the drive time required for an EONV test entry condition may be decreased. In this way, the EONV completion rate may be increased.

Figure 6:
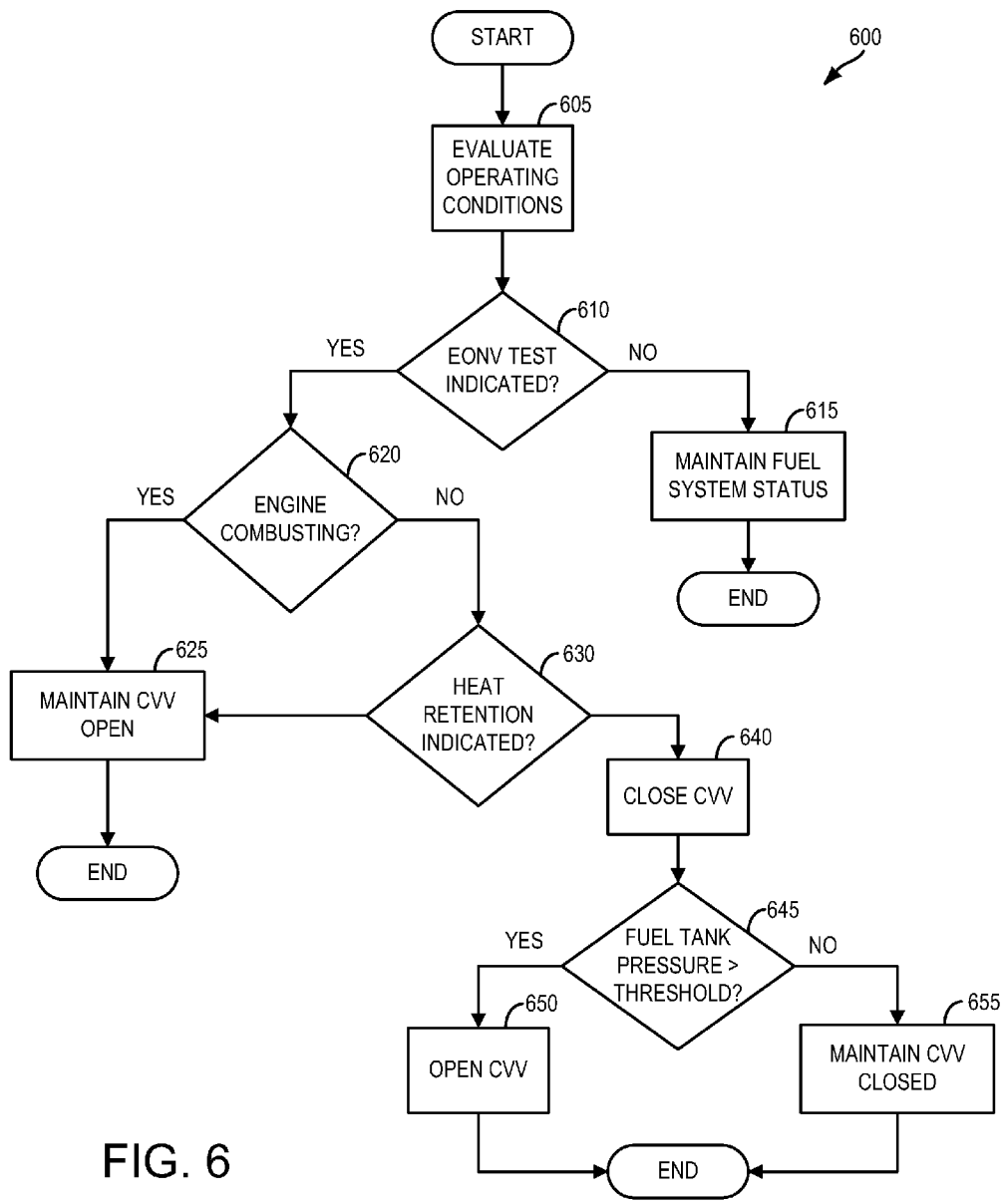
FIG. 6 shows an example flow chart for a high-level method for retaining fuel tank heat in a hybrid vehicle.
Figure 7:
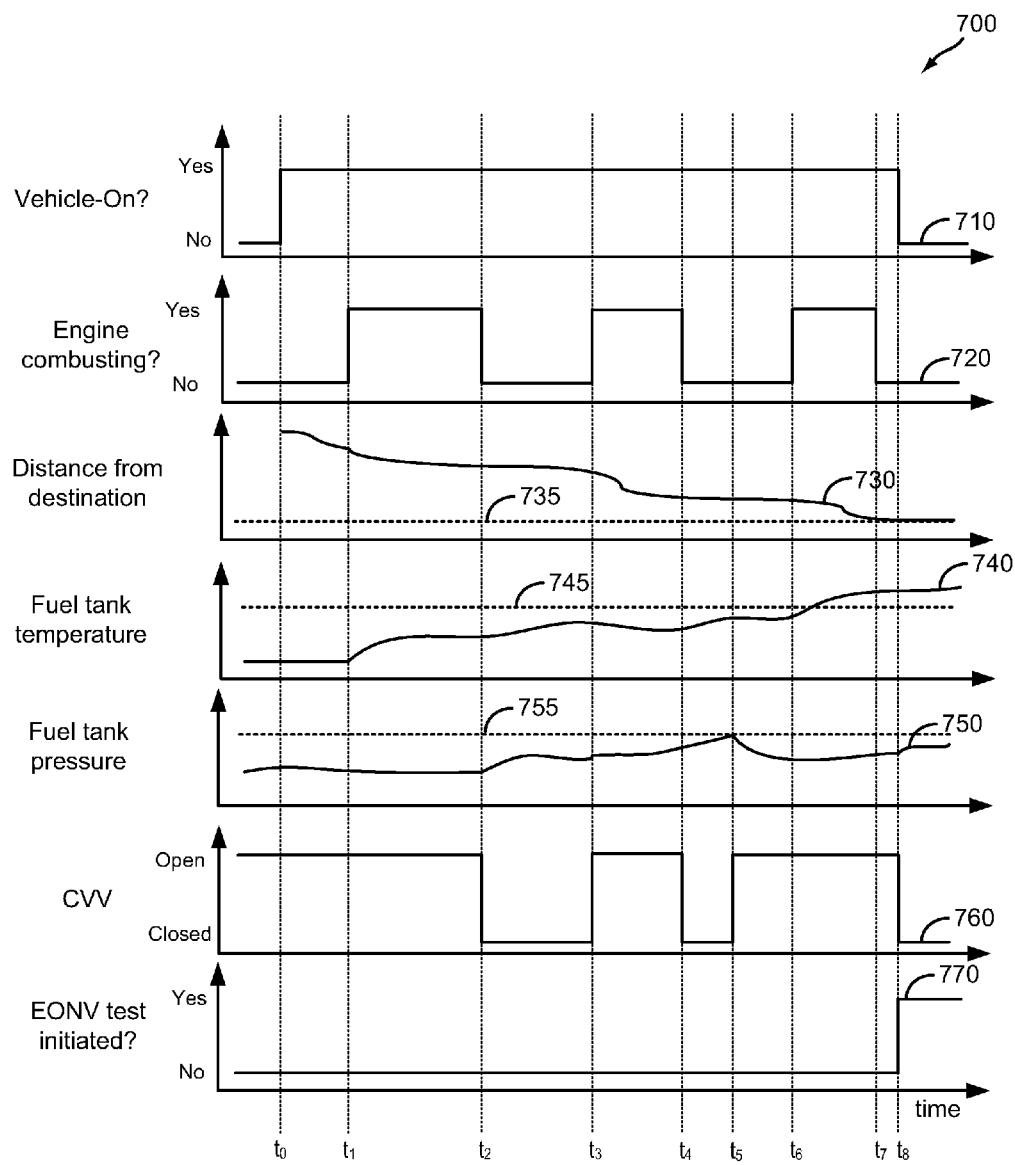
FIG. 7 shows an example timeline for initiating an EONV test using the method of FIG. 6.

FIG. 6 shows an example flow chart for a high-level method 600 for retaining fuel tank heat in accordance with the present disclosure. Method 600 will be described in reference to the system described in FIG. 1, though it should be understood that method 600 may be applied to other systems without departing from the scope of this disclosure. Method 600 may be carried out by a controller, such as controller 12, and may be stored as executable instructions in non-transitory memory.

Method 600 may begin at 605. At 605, method 600 may include evaluating operating conditions. Operating conditions may be measured, estimated or inferred, and may include various vehicle conditions, such as vehicle speed and vehicle location, various engine operating conditions, such as engine operating mode, engine speed, engine temperature, exhaust temperature, boost level, MAP, MAF, torque demand, horsepower demand, etc., and various ambient conditions, such as temperature, barometric pressure, humidity, date, time, etc.

Continuing at 610, method 600 may include determining whether an EONV test is indicated following the next vehicle-off event. Determining whether an EONV test is indicated may include accessing an EONV testing history stored on controller 12, executing an algorithm to determine whether an EONV test is required to maintain vehicle emissions compliance, etc. If an EONV test is not indicated, method 600 may proceed to 615, wherein the current status of the fuel system may be maintained. Method 600 may then end.

If an EONV test is indicated, method 600 may proceed to 620. At 620, method 600 may include determining whether the engine is combusting. Determining whether the engine is combusting may include determining a vehicle operation mode. The engine may be considered combusting during engine-only operation and/or during engine-battery hybrid operation, while the engine may be considered not combusting during battery-only operation, idling operation, and decel shutoff mode operation. If the engine is combusting, method 600 may proceed to 625. At 625, method 600 may include maintaining the CVV open. Method 600 may then end.

If the engine is not combusting, method 600 may proceed to 630. At 630, method 600 may include determining whether heat retention is indicated. Heat retention may be indicated based on operating conditions, such as fuel tank temperature, fuel tank pressure, airmass accumulation, ambient temperature, etc. Further heat retention may be indicated based on trip parameters. As described with regards to FIGS. 3 and 4, cumulative and remaining trip parameters may be estimated or calculated based on a programmed or predicted route for the vehicle. For example, if the remaining vehicle route is primarily uphill, heat retention may not be indicated, as the engine is likely to be combusting for a majority of the remaining trip. In contrast, if the remaining vehicle route is primarily downhill, heat retention may be indicated, as the engine is likely to not be combusting for a majority of the remaining trip. If heat retention is not indicated, method 600 may proceed to 625, and may include maintaining the CVV open.

If heat retention is indicated, method 600 may proceed to 640. At 640, method 600 may include closing the CVV. This may include maintaining the CVV closed while the engine is not combusting. Continuing at 645, method 600 may include determining whether the fuel tank pressure is above a threshold. The fuel tank pressure threshold may be predetermined, such as a safety threshold for a particular fuel tank configuration, or may be based on operating conditions. The current fuel tank pressure may be inferred, or may be based on a signal from a fuel tank pressure sensor. If the fuel tank pressure is above the threshold, method 600 may proceed to 650, and may include opening the CVV. Method 600 may then end. If the fuel tank pressure is not above the threshold, method 600 may proceed to 655, and may include maintaining the CVV closed. Method 600 may then end.

FIG. 7 shows an example timeline 700 for retaining fuel tank heat in a hybrid vehicle using the method described herein and with regard to FIG. 6 as applied to the system described herein and with regard to FIG. 1. Timeline 700 includes plot 710, indicating a vehicle-on status of a vehicle over time, and plot 720, indicating a combustion status of the vehicle engine over time. Timeline 700 further includes plot 730 indicating the vehicle's distance from a destination over time. Line 735 represents a location of the predicted destination. Timeline 700 further includes plot 740, indicating a fuel tank temperature over time. Line 745 represents a threshold fuel tank temperature, above which an EONV test is likely to execute successfully. Timeline 700 further includes plot 750, indicating a fuel tank pressure over time. Line 755 indicates a threshold fuel tank pressure, above which excessive pressure should be relieved. Timeline 700 further includes plot 760, indicating the status of a canister vent valve over time, and plot 770, indicating whether an EONV test has been initiated over time.

At time $t_0$, the vehicle is turned on, but the engine is not combusting, as indicated by plots 710 and 720, respectively. Accordingly, the CVV is maintained open, as shown by plot 760. A destination is input by the vehicle operator, and a current distance from the input destination may be estimated, as shown by plot 730. The vehicle begins to progress towards the destination in an engine-off mode. Accordingly, the fuel tank temperature and pressure remain relatively constant, as indicated by plot 740 and 750, respectively.

At time $t_1$, the vehicle engine enters a combustion mode, as indicated by plot 720. The CVV is maintained open, as indicated by plot 760. As heat is rejected to the fuel tank, the fuel tank temperature and pressure begin to increase. At time $t_2$, the vehicle enters an engine-off, vehicle-on mode. In order to limit heat dissipation from the fuel tank, the CVV is closed, as indicated by plot 760. This may be indicated due to the distance of the vehicle from the destination, as the trip may have a low likelihood of rejecting a large enough quantity of heat to the fuel tank for an EONV test to execute successfully. Although the engine is off, heat continues to be rejected into the fuel tank from the heated engine block. Accordingly, the fuel tank temperature and pressure rise gradually while the engine is off and the CVV is closed.

From time $t_3$ to time $t_4$, the vehicle engine enters a combustion mode, and the CVV is reopened. At time $t_4$, the engine stops combusting. As the fuel tank temperature is below the threshold indicated by line 745, and the destination is approaching, heat retention is indicated, and the CVV is again closed. At time $t_5$, the engine is still in a non-combusting mode, but as heat continues to be rejected to the fuel tank, the fuel tank pressure increases to the pressure threshold indicated by line 755. Accordingly, the CVV is opened. From time $t_6$ to time $t_7$, the vehicle engine operates in a combustion mode with the CVV maintained open. At time $t_7$, the engine stops combusting. As the fuel tank temperature is above the threshold indicated by line 745, and the vehicle has nearly reached the destination, heat retention is not indicated, and the CVV is maintained open. At time $t_8$, the vehicle reaches its destination, and is turned off. Accordingly, the CVV is closed, and an EONV test is initiated.

The systems described herein and with regard to FIG. 1, along with the methods described herein and with regard to FIGS. 3, 4, and 6 may enable one or more systems and one or more methods. In one example, a method for a vehicle, comprising: during a first condition, closing a canister vent valve responsive to an engine-off event without initiating an engine-off natural vacuum test; during a second condition, following the first condition, closing the canister vent valve responsive to a vehicle-off event; and only then initiating an engine-off natural vacuum test. The first condition may include an indication that retaining heat during the engine-off event will increase a likelihood of the engine-off natural vacuum test executing successfully. The first condition may include a likelihood of an engine restart during a predetermined window being above a threshold. The second condition may include a likelihood of an engine restart during the predetermined window being below the threshold. The method may further comprise: closing the canister vent valve prior to the vehicle-off event responsive to an indication that retaining heat will increase a likelihood of the engine-off natural vacuum test executing successfully. The indication that retaining heat will increase the likelihood of the engine-off natural vacuum test executing successfully may be based on a total airmass being below a threshold. The likelihood of an engine restart during the predetermined window may be based on a predicted destination determined through machine learning. The first condition may further include a vehicle-off event. The indication that retaining heat during the engine-off event will increase the likelihood of the engine-off natural vacuum test executing successfully may be based on a predicted route the vehicle will take between the engine off event and a subsequent vehicle-off event. The predicted route may be based on a predicted destination determined through machine learning. The technical result of implementing this method is an increased completion percentage for an engine-off natural vacuum test. By closing the canister vent valve during an engine-off event, heat rejected to the fuel tank may be retained during the engine-off event. By initiating the engine-off natural vacuum test at a subsequent vehicle-off event, the likelihood of an engine restart disrupting the engine-off natural vacuum test may be decreased.

In another example, a method for a vehicle, comprising: at a first vehicle-off event, determining a likelihood of a next vehicle-on event during a predetermined window; and closing a canister vent valve if the likelihood is above a threshold. The likelihood of a next vehicle-on event during a predetermined window may be based on a predicted destination of the vehicle. The method may further comprise: opening the canister vent valve upon the next vehicle-on event; responsive to the vehicle reaching the predicted destination, closing the canister vent valve at a subsequent vehicle-off event; and executing an engine-off natural vacuum test at the predicted destination. The method may further comprise: closing the canister vent valve at the first vehicle-off event responsive to determining that retaining heat during the first vehicle-off event will increase a likelihood of a subsequent engine-off natural vacuum test executing successfully. The likelihood of a subsequent engine-off natural vacuum test executing successfully may be based on a predicted route the vehicle will take between the first vehicle-off event and a subsequent vehicle-off event. The technical result of implementing this method is that engine-off natural vacuum tests may be performed when the vehicle-off duration is likely to be greater than the duration of the test. The vehicle may be trained through machine learning to anticipate when the vehicle is likely to be stopped for a short period of time followed by a vehicle-on event, based on driving habits of the vehicle operator.

In yet another example, a method for a hybrid vehicle, comprising: during a first condition, closing a canister vent valve while operating the hybrid vehicle in an engine-off mode; and opening the canister vent valve responsive to the hybrid vehicle entering a combustion mode. The first condition may include an indication to perform an engine-off natural vacuum test at a subsequent vehicle-off event. The method may further comprise: responsive to a vehicle-off event, closing the canister vent valve; and executing an engine-off natural vacuum test. The method may further comprise: closing the canister vent valve prior to the vehicle-off event responsive to an indication that retaining heat will increase a likelihood of the engine-off natural vacuum test executing successfully. The method may further comprise: opening the canister vent valve while operating the hybrid vehicle in an engine-off mode responsive to a fuel tank pressure increasing above a threshold. The technical result of implementing this method is an increase in the robustness of the engine-off natural vacuum test for vehicles with limited engine run time. The heat rejected to the fuel tank during engine-on operation may be retained by sealing the fuel system. Thus, the entry-conditions for the engine-off natural vacuum test may be met more frequently.

Note that the example control and estimation routines included herein can be used with various engine and/or vehicle system configurations. The control methods and routines disclosed herein may be stored as executable instructions in non-transitory memory. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for a vehicle, comprising:
during a first condition:
receiving an indication of a first engine-off event;
receiving an indication that retaining heat during the first engine-off event will increase a likelihood of an engine-off natural vacuum test executing successfully;
following the first engine-off event, closing a canister vent valve based on the heat retention indication without initiating the engine-off natural vacuum test;
receiving an indication of an engine-on event; and
opening the canister vent valve following the engine-on event; and
during a second condition, following the first condition:
receiving an indication of a vehicle-off event, including a second engine-off event;
following the vehicle-off event, closing the canister vent valve based on the vehicle-off event; and then
initiating the engine-off natural vacuum test.

2. The method of claim 1, where the first condition includes a likelihood of an engine restart during a predetermined window being above a threshold.

3. The method of claim 2, where the second condition includes a likelihood of an engine restart during a predetermined window being below the threshold.

4. The method of claim 2, where the likelihood of an engine restart during the predetermined window is based on a predicted destination determined through machine learning.

5. The method of claim 1, further comprising:
receiving an indication that retaining heat will increase a likelihood of the engine-off natural vacuum test executing successfully; and
closing the canister vent valve prior to the vehicle-off event based on the received indication.

6. The method of claim 5, where the indication that retaining heat will increase the likelihood of the engine-off natural vacuum test executing successfully is based on a total airmass through an engine intake during a current drive cycle being below a threshold.

7. The method of claim 1, where the first condition includes a vehicle-off event, and wherein a vehicle-on event occurs between the first condition and second condition.

8. The method of claim 1, where the indication that retaining heat during the engine-off event will increase the likelihood of the engine-off natural vacuum test executing successfully is based on a predicted route the vehicle will take between the engine-off event and a subsequent vehicle-off event.

9. The method of claim 8, where the predicted route is based on a predicted destination determined through machine learning.

10. A method for a vehicle, comprising:
- at a first vehicle-off event, determining a likelihood of a next vehicle-on event during a predetermined window;
- closing a canister vent valve at the first vehicle-off event if the determined likelihood is above a threshold; and
- maintaining a status of a fuel system at the first vehicle-off event if the determined likelihood is below the threshold.

11. The method of claim 10, where the likelihood of a next vehicle-on event during a predetermined window is based on a predicted destination of the vehicle.

12. The method of claim 11, further comprising:
- opening the canister vent valve upon the next vehicle-on event;
- receiving an indication of the vehicle reaching the predicted destination;
- closing the canister vent valve at a subsequent vehicle-off event; and
- executing an engine-off natural vacuum test at the predicted destination.

13. The method of claim 10, further comprising:
- receiving an indication that retaining heat during the first vehicle-off event will increase a likelihood of a subsequent engine-off natural vacuum test executing successfully; and
- closing the canister vent valve at the first vehicle-off event based on the received indication.

14. The method of claim 13, where the likelihood of a subsequent engine-off natural vacuum test executing successfully is based on a predicted route the vehicle will take between the first vehicle-off event and a subsequent vehicle-off event.

15. A method, comprising:
- during vehicle-on, engine-off operation where a hybrid vehicle is en route to a destination and responsive to an indication to perform an engine-off natural vacuum test at a subsequent vehicle-off event, closing a canister vent valve and maintaining a canister purge valve closed;
- responsive to vehicle-on, engine-on operation, opening the canister vent valve; and
- responsive to the subsequent vehicle-off event, closing the canister vent valve and executing the engine-off natural vacuum test.

16. The method of claim 15, further comprising:
- receiving an indication that retaining heat will increase a likelihood of the engine-off natural vacuum test executing successfully; and then
- closing the canister vent valve prior to the vehicle-off event.

17. The method of claim 15, further comprising:
- receiving an indication of a fuel tank pressure increasing above a threshold while operating the hybrid vehicle in the vehicle-on, engine-off operation; and then
- opening the canister vent valve.

* * * * *